(12) United States Patent
Miyamoto et al.

(10) Patent No.: US 10,396,872 B2
(45) Date of Patent: Aug. 27, 2019

(54) COMMUNICATION SYSTEM, RELAY APPARATUS, RECEIVING APPARATUS, RELAY METHOD, RECEIVING METHOD, RELAY PROGRAM, AND RECEIVING PROGRAM

(71) Applicant: NIPPON TELEGRAPH AND TELEPHONE CORPORATION, Tokyo (JP)

(72) Inventors: Kenji Miyamoto, Yokosuka (JP); Shigeru Kuwano, Yokosuka (JP); Jun Terada, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/501,046

(22) PCT Filed: Mar. 4, 2016

(86) PCT No.: PCT/JP2016/056846
§ 371 (c)(1),
(2) Date: Feb. 1, 2017

(87) PCT Pub. No.: WO2017/149774
PCT Pub. Date: Sep. 8, 2017

(65) Prior Publication Data
US 2019/0028161 A1    Jan. 24, 2019

(51) Int. Cl.
*H04B 7/08* (2006.01)
*H04B 7/15* (2006.01)
(Continued)

(52) U.S. Cl.
CPC ............. *H04B 7/0482* (2013.01); *H04B 7/08* (2013.01); *H04B 7/0857* (2013.01); *H04B 7/15* (2013.01);
(Continued)

(58) Field of Classification Search
CPC .. H04B 7/0404; H04B 7/0413; H04B 7/0482; H04B 7/0845; H04B 7/0857; H04B 7/14;
(Continued)

(56) References Cited

U.S. PATENT DOCUMENTS 5,859,932 A * 1/1999 Etoh ........................ G06T 9/008
                                                          375/E7.209
5,970,443 A * 10/1999 Fujii ........................ G10L 19/18
                                                          704/219
(Continued)

FOREIGN PATENT DOCUMENTS

JP    2010-041688 A    2/2010
JP    2010-161768 A    7/2010
(Continued)

OTHER PUBLICATIONS

Guido Dietl et al: "A Quantize-and-Forward Scheme for Future Wireless Relay Networks", Vehicular Technology Conference (VTC Fall), 2011 IEEE, IEEE, Sep. 5, 2011 (Sep. 5, 2011), pp. 1-4.
(Continued)

*Primary Examiner* — Young T Tse
(74) *Attorney, Agent, or Firm* — Harness, Dickey & Pierce, P.L.C.

(57) ABSTRACT

A relay apparatus includes: an estimation unit selects a code book number corresponding to a reception SNR range based on an estimated reception SNR value; a soft demodulation unit that performs soft demodulation on a received first signal to detect a likelihood of the received first signal; a first memory unit that stores a first quantization code book
(Continued)

showing, for each code book number, a relationship between a quantization parameter and a likelihood quantization bit value; a quantization unit that refers the first quantization code book to obtain a relationship between a quantization parameter and a likelihood quantization bit value that corresponds to the selected code book number, and adaptively quantizes the detected likelihood by using the obtained relationship to obtain a likelihood quantization bit value; and a transmission unit that transmits, to the receiving apparatus, a second signal including the obtained likelihood quantization bit value and the selected code book number.

7 Claims, 8 Drawing Sheets

(51) Int. Cl.
  *H04B 7/0456* (2017.01)
  *H04B 17/336* (2015.01)
  *H04L 25/06* (2006.01)
  *H04L 1/00* (2006.01)
  *H04B 17/382* (2015.01)
(52) U.S. Cl.
  CPC ......... *H04B 17/336* (2015.01); *H04B 17/382* (2015.01); *H04L 1/0054* (2013.01); *H04L 25/067* (2013.01)
(58) Field of Classification Search
  CPC ...... H04B 7/145; H04B 7/15; H04B 7/15507; H04B 7/15542; H04B 7/15592; H04B 17/336; H04B 17/373; H04B 17/382; H04B 7/08; H04L 1/0054; H04L 1/0643; H04L 2002/0097; H04L 25/067; H04L 25/20
  USPC ....... 375/141, 211, 212, 219, 200, 225, 227, 375/259, 262, 265, 267, 340, 341, 356; 370/274, 278, 282, 293, 310.2, 315, 328, 370/332, 333; 455/11.1, 13.1, 16, 500, 455/507, 513, 524, 88
  See application file for complete search history.

(56) References Cited

U.S. PATENT DOCUMENTS

| | | | |
|---|---|---|---|
| 2004/0117178 A1* | 6/2004 | Ozawa | G10L 19/10 704/230 |
| 2010/0157878 A1 | 6/2010 | Zeitler et al. | |
| 2010/0254300 A1* | 10/2010 | Gulasekaran | H04B 7/155 370/315 |
| 2011/0066822 A1* | 3/2011 | Ikeda | G06F 13/4059 711/170 |
| 2015/0229380 A1 | 8/2015 | Bartelt et al. | |

FOREIGN PATENT DOCUMENTS

| | | |
|---|---|---|
| JP | 2010-171960 A | 8/2010 |
| WO | WO-2012/012248 A1 | 1/2012 |
| WO | WO-2015/079386 A1 | 6/2015 |

OTHER PUBLICATIONS

Extended European Search Report in related application EP 16838077.2, EPO, Munich, dated Sep. 27, 2018.
Japanese Office Action in related application JP 2014-183136, "Notice of Reasons for Rejection", dated Jun. 6, 2017, with English translation attached.
Japanese Office Action in related application JP 2014-183136, "Notice of Reasons for Rejection", dated Jan. 9, 2018, with English translation attached.
S. Ibi et al., A Study on Optimizations of Quantization Threshold for Decode-Quantize-Forward Relaying, IEICE Technical Report, vol. 113, No. 456, RCS2013-336 (Mar. 2014), pp. 181-186 with partial translation.
Clemens Novak, et al., Proc. ISIT 2009, pp. 1070-1074, "Quantization for Soft-Output Demodulators in Bit-Interleaved Coded Modulation Systems", Jul. 2009.
International Search Report for PCT/JP2016/056846, ISA/JP, Tokyo, dated Apr. 12, 2016 with English translation.

* cited by examiner

- -PRIOR ART- -

--PRIOR ART--

FIG. 4

| MODULATION METHOD | RECEPTION SNR RANGE | CODE BOOK NUMBER | LIKELIHOOD QUANTIZATION BIT VALUE | LIKELIHOOD QUANTIZATION LEVEL VALUE |
|---|---|---|---|---|
| FIRST MODULATION METHOD | FIRST RECEPTION SNR RANGE | 00 | 00 | -0.5 |
| | | | 01 | -0.25 |
| | | | 10 | 0.3 |
| | | | 11 | 0.6 |
| | SECOND RECEPTION SNR RANGE | 01 | 00 | -1.2 |
| | | | 01 | -0.5 |
| | | | 10 | 0.6 |
| | | | 11 | 1 |
| SECOND MODULATION METHOD | FIRST RECEPTION SNR RANGE | 10 | 00 | -1.5 |
| | | | 01 | -1.25 |
| | | | 10 | 1.3 |
| | | | 11 | 1.6 |
| | SECOND RECEPTION SNR RANGE | 11 | 00 | -2.2 |
| | | | 01 | -1.5 |
| | | | 10 | 1.6 |
| | | | 11 | 2 |

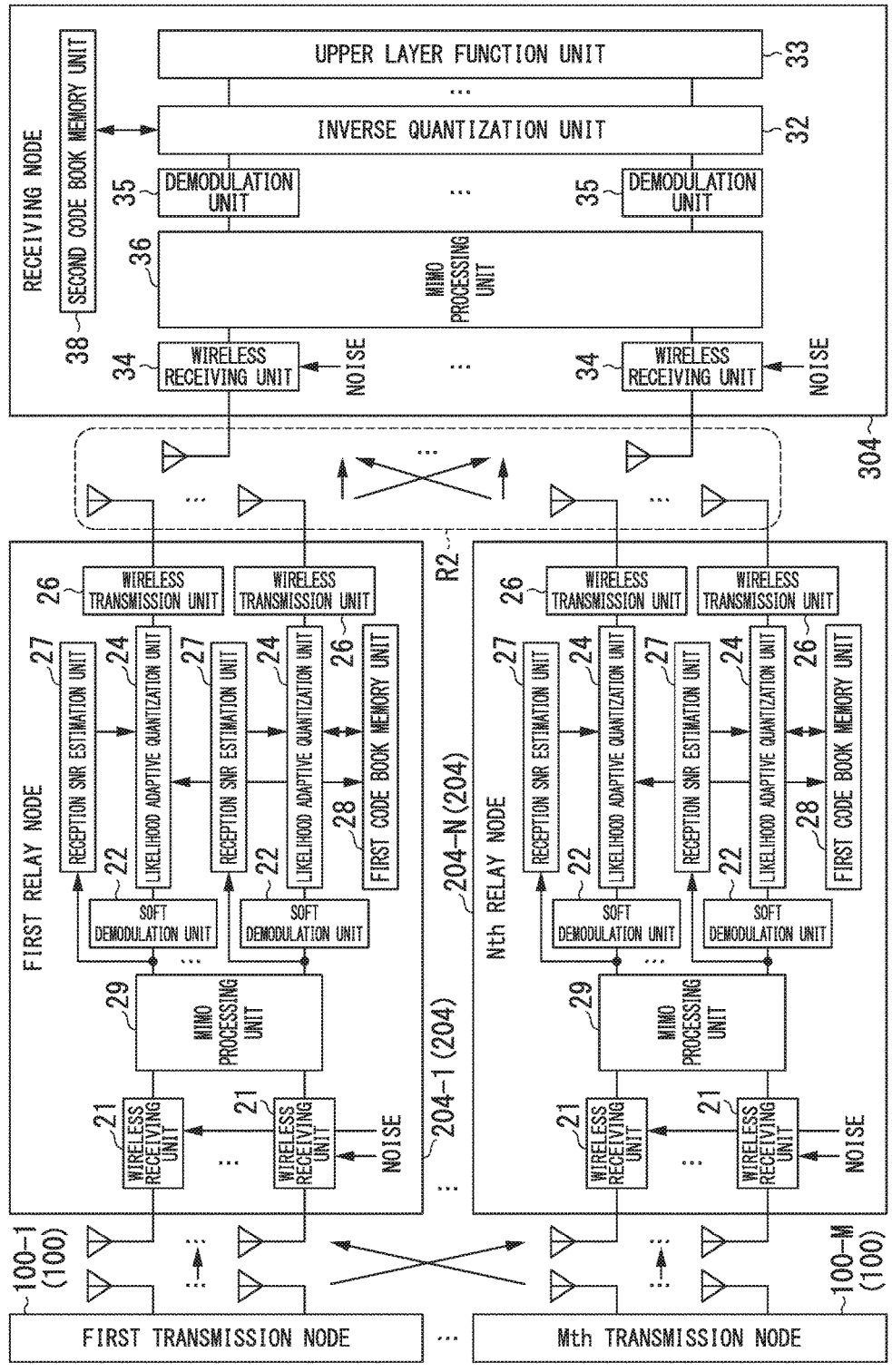

COMMUNICATION SYSTEM, RELAY APPARATUS, RECEIVING APPARATUS, RELAY METHOD, RECEIVING METHOD, RELAY PROGRAM, AND RECEIVING PROGRAM

CROSS-REFERENCE TO RELATED APPLICATIONS

This application is a 371 U.S. National Stage of International Application No. PCT/JP2016/056846, filed Mar. 4, 2016, the entire disclosures of which are incorporated herein by reference.

TECHNICAL FIELD

The present invention relates to a communication system, a relay apparatus, a receiving apparatus, a relay method, a receiving method, a relay program, and a receiving program that improve communication quality by relaying signals from a transmission apparatus.

BACKGROUND ART

In the present description, the transmission apparatus, the relay apparatus, and the receiving apparatus may be referred to as a transmission node, a relay node, and a receiving node respectively.

There has been considered a communication system that utilizes a plurality of relay nodes present between a transmission node and a receiving node to thereby improve the quality of communication, in a communication system, particularly, in a wireless communication system. FIG. 1 is a diagram for describing a configuration of a communication system that utilizes a plurality of relay nodes. The communication system shown in FIG. 1 shows a transmission node 100, a first relay node 200-1, a second relay node 200-2, and a receiving node 300. The first relay node 200-1 and the second relay node 200-2 are collectively referred to as relay nodes 200 when they are not differentiated. The number of relay nodes 200 in the communication system may be an arbitrary number not less than 1. The connection between the transmission node 100 and the relay nodes 200, and the connection between the relay nodes 200 and the receiving node 300 may be either one of wired connection and wireless connection.

There has been a communication system in which a likelihood detected in a relay node in communication between a transmission node and a relay node is quantized and forwarded to a receiving node. Furthermore, there has been considered a relay system in which quantization parameters are adaptively changed according to the probability distribution of a detected likelihood, in order to reduce likelihood quantization bits (for example, refer to Non-Patent Document 2).

There has been considered a configuration in a wireless communication system, particularly, in a mobile communication system, such that a plurality of antenna units equipped with some base station functions are physically stretched out and these antenna units are used as distributed stations. An antenna unit refers to a unit that is equipped with a transmission interface, a wireless transmitter/receiver, and an antenna. A base station with distributed stations stretched out therefrom functions as a central station to control the plurality of distributed stations.

FIG. 2 is a diagram for describing a configuration of a communication system that uses likelihood adaptive quantization in the case where the relay nodes and the receiving node are connected by means of wired connection. The transmission node 100, the relay nodes 200, and the receiving node 300 in this case can be perceived respectively as a terminal, distributed stations, and a central station in the mobile communication system described above where the base station functions are divided into the central station and the distributed stations.

First, a signal transmitted from the transmission node 100 is received at a wireless receiving unit 21 of the relay node 200. The signal gets noise added thereto. A soft demodulation unit 22 of each relay node 200 performs soft demodulation on the received signal, to thereby detect the likelihood of the received signal. Next, a quantization parameter calculation unit 23 calculates a quantization parameter (what type of quantization width to be employed) by observing the probability distribution of the detected likelihood. A likelihood adaptive quantization unit 24 performs likelihood adaptive quantization according to this quantization parameter. For example, a quantization parameter may be a quantization level value, which is a value after likelihood has been quantized.

The quantized likelihood is transmitted as a likelihood quantized value, which is expressed as a bit of '0' or '1', from the wired transmission unit 25 of each relay node 200 to the receiving node 300. The receiving node 300 is yet to know what type of quantization parameter is used in quantization of the transmitted likelihood. Consequently, the relay node 200 needs to notify the receiving node 300 of the quantization parameter as well as the likelihood quantization bit value. In FIG. 2, reference symbol R1 denotes a signal that includes a likelihood quantization bit value and a quantization parameter (the same applies to the example in FIG. 3). Finally, an inverse quantization unit 32 of the receiving node 300 performs an inverse quantization process to determine the received bit, based on the notified quantization parameter, and the signal is forwarded to an upper layer function unit 33.

FIG. 3 is a diagram for describing a configuration of a communication system that uses likelihood adaptive quantization in the case where the connection between the relay nodes 200 and the receiving node 300 is wireless connection. In this case, the process up to performing likelihood adaptive quantization in the relay node 200 is similar to that in the configuration of FIG. 2. A likelihood quantization bit value is modulated in a wireless transmission unit 26, and is transmitted as a wireless signal to the receiving node 300. In the receiving node 300, each wireless receiving unit 34 receives a signal from each receiving node 200. A demodulation unit 35 demodulates the received signal, and the inverse quantization unit 32 performs the inverse quantization process on the demodulated signal. At this time, the demodulation process may be either one of hard determination and soft determination.

The communication systems shown in FIG. 2 and FIG. 3 enable improved communication quality, compared to that in performing direct communication between the transmission node and the receiving node.

PRIOR ART DOCUMENTS

Non-Patent Documents

[Non-Patent Document 1] Shinsuke Ibi, Seiichi Sampei, IEICE Technical Report, vol. 113, no. 456, RCS2013-336, pp. 181-186, "A Study on Optimizations of Quantization Threshold for Decode-Quantize-Forward Relaying", March, 2014.

[Non-Patent Document 2] Clemens Novak, et al., Proc. ISIT 2009, pp. 1070-1074, "Quantization for Soft-Output Demodulators in Bit-Interleaved Coded Modulation Systems" July, 2009.

SUMMARY OF THE INVENTION

Problem to be Solved by the Invention

However, in the configurations of FIG. 2 and FIG. 3, the number of bits required when notifying the quantization parameter, which change according to the reception quality, becomes great. As a result, there is a problem in that overhead of signals transmitted from the relay node to the receiving node will increase. For example, in the case where the likelihood is quantized by 3 bits, it is necessary that the receiving node is notified of an 8-step quantization level value (quantization parameter) every time when the reception quality changes. Moreover, in order to express each quantization level value, a numerical expression such as a floating-point number needs to be used. For example, in the case of using a double precision floating-point number, a 64-bit bit number is required for a single quantization level value. That is to say, the relay node is required to notify the receiving node of the quantization parameter that is adapted to the current signal (quantization level value for each step). In the case of the above example, a number of bits as many as 512 (=8 steps×64 bits) is required for a single quantization parameter notification.

In order to solve the problem above, an object of the present invention is to provide a communication system, a relay apparatus, a receiving apparatus, a relay method, a receiving method, a relay program, and a receiving program, capable of reducing the number of bits required for quantization parameter notification to reduce transmission overhead, in the case where a relay apparatus detects and quantizes the likelihood of a signal from a transmission apparatus, and transmits it to a receiving apparatus.

Means for Solving the Problem

A communication system according to a first aspect of the present invention includes a transmission apparatus, a receiving apparatus, and a relay apparatus that relays a signal from the transmission apparatus to the receiving apparatus The transmission apparatus transmits a first signal.

The relay apparatus includes: a first receiving unit that receives the transmitted first signal; an estimation unit that estimates a reception signal to noise ratio (SNR) value from signal electric power of the received first signal and noise electric power, the estimation unit selecting a code book number based on the estimated reception SNR value, the code book number corresponding to a reception SNR range, the reception SNR range having a range including the estimated reception SNR value; a soft demodulation unit that performs soft demodulation on the received first signal to detect a likelihood of the received first signal; a first memory unit that stores a first quantization code book, the first quantization code book showing, for each code book number, a relationship between a quantization parameter for quantizing a likelihood, and a likelihood quantization bit value showing a quantized likelihood; a quantization unit that refers the first quantization code book to obtain a relationship between a quantization parameter and a likelihood quantization bit value that corresponds to the selected code book number, the quantization unit adaptively quantizing the detected likelihood by using the obtained relationship to obtain a likelihood quantization bit value; and a transmission unit that transmits, to the receiving apparatus, a second signal including the obtained likelihood quantization bit value and the selected code book number.

The receiving apparatus includes: a second receiving unit that receives the transmitted second signal; a second memory unit that stores a second quantization code book having the same content as that of the first quantization code book; and an inverse quantization unit that refers the second quantization code book to obtain a relationship between a quantization parameter and a likelihood quantization bit value that corresponds to the selected code book number included in the received second signal, the inverse quantization unit inverse-quantizing the likelihood quantization bit value included in the received second signal, by using the obtained relationship.

A relay apparatus according a second aspect of the present invention is a relay apparatus for relaying a signal from a transmission apparatus to a receiving apparatus. The relay apparatus includes: a first receiving unit that receives a first signal transmitted by the transmission apparatus; an estimation unit that estimates a reception signal to noise ratio (SNR) value from signal electric power of the received first signal and noise electric power, the estimation unit selecting a code book number based on the estimated reception SNR value, the code book number corresponding to a reception SNR range, the reception SNR range having a range including the estimated reception SNR value; a soft demodulation unit that performs soft demodulation on the received first signal to detect a likelihood of the received first signal; a first memory unit that stores a first quantization code book, the first quantization code book showing, for each code book number, a relationship between a quantization parameter for quantizing a likelihood, and a likelihood quantization bit value showing a quantized likelihood; a quantization unit that refers the first quantization code book to obtain a relationship between a quantization parameter and a likelihood quantization bit value that corresponds to the selected code book number, the quantization unit adaptively quantizing the detected likelihood by using the obtained relationship to obtain a likelihood quantization bit value; and a transmission unit that transmits, to the receiving apparatus, a second signal including the obtained likelihood quantization bit value and the selected code book number.

A receiving apparatus according to a third aspect of the present invention is a receiving apparatus for receiving the second signal transmitted by the relay apparatus according to the second aspect. The receiving apparatus includes: a second receiving unit that receives the second signal transmitted by the relay apparatus; a second memory unit that stores a second quantization code book having the same content as that of the first quantization code book; and an inverse quantization unit that refers the second quantization code book to obtain a relationship between a quantization parameter and a likelihood quantization bit value that corresponds to the selected code book number included in the received second signal, the inverse quantization unit inverse-quantizing the likelihood quantization bit value included in the received second signal, by using the obtained relationship.

A relay method according to a fourth aspect of the present invention is a relay method for relaying a signal from a transmission apparatus to a receiving apparatus. The relay method includes: receiving a first signal transmitted by the transmission apparatus; estimating a reception signal to noise ratio (SNR) value from signal electric power of the received first signal and noise electric power; selecting a code book number based on the estimated reception SNR value, the code book number corresponding to a reception SNR range, the reception SNR range having a range including the estimated reception SNR value; performing soft demodulation on the received first signal to detect a likelihood of the first signal; referring a first quantization code book to obtain a relationship between a quantization parameter and a likelihood quantization bit value that corresponds to the selected code book number, the first quantization code book showing, for each code book number, a relationship between a quantization parameter for quantizing a likelihood, and a likelihood quantization bit value showing a quantized likelihood; adaptively quantizing the detected likelihood by using the obtained relationship to obtain a likelihood quantization bit value; and transmitting, to the receiving apparatus, a second signal including the obtained likelihood quantization bit value and the selected code book number.

A receiving method according to a fifth aspect of the present invention is a receiving method for receiving the second signal transmitted by the relay method according to fourth aspect. The receiving method includes: receiving the second signal transmitted by the relay method; referring a second quantization code book to obtain a relationship between a quantization parameter and a likelihood quantization bit value that corresponds to the selected code book number included in the received second signal, the second quantization code book having the same content as that of the first quantization code book; and inverse-quantizing the likelihood quantization bit value included in the received second signal, by using the obtained relationship.

A relay program according to a sixth aspect of the present invention is a relay program for causing a computer to realize relay of a signal from a transmission apparatus to a receiving apparatus. The relay program causes the computer to execute: receiving a first signal transmitted by the transmission apparatus; estimating a reception signal to noise ratio (SNR) value from signal electric power of the received first signal and noise electric power; selecting a code book number based on the reception SNR value, the code book number corresponding to a reception SNR range, the reception SNR range having a range including the reception SNR value; performing soft demodulation on the received first signal to detect a likelihood of the first signal; referring a first quantization code book to obtain a relationship between a quantization parameter and a likelihood quantization bit value that corresponds to the selected code book number, the first quantization code book showing, for each code book number, a relationship between a quantization parameter for quantizing a likelihood, and a likelihood quantization bit value showing a quantized likelihood; adaptively quantizing the detected likelihood by using the obtained relationship to obtain a likelihood quantization bit value; and transmitting, to the receiving apparatus, a second signal including the obtained likelihood quantization bit value and the selected code book number.

A receiving program according to a seventh aspect of the present invention is a receiving program for causing a computer to realize reception of the second signal transmitted by the relay apparatus according to the second aspect. The receiving program causes the computer to execute: receiving the second signal transmitted by the relay apparatus; referring a second quantization code book to obtain a relationship between a quantization parameter and a likelihood quantization bit value that corresponds to the selected code book number included in the received second signal, the second quantization code book having the same content as that of the first quantization code book; and inverse-quantizing the likelihood quantization bit value included in the received second signal, by using the obtained relationship.

Effect of the Invention

According to a relay apparatus, a receiving apparatus, a relay method, a receiving method, a relay program, and a receiving program of an embodiment of the present invention, it is possible to reduce the number of bits required for quantization parameter notification, and reduce transmission overhead, in the case where a relay apparatus detects and quantizes the likelihood of a signal, and transmits it to a receiving apparatus.

BRIEF DESCRIPTION OF THE DRAWINGS

FIG. 4 is a diagram for describing an example of a quantization code book used in a communication system according to an embodiment of the present invention.

FIG. 8 is a diagram for describing a configuration of a communication system according to a fourth embodiment.

EMBODIMENTS FOR CARRYING OUT THE INVENTION

Hereunder, embodiments of the present invention are described, with reference to the accompanying drawings. The embodiments described below are embodiments of the present invention, and the invention is not limited by the embodiments below. In the present description and figures, constituents with the same reference symbols show the same constituents.

The embodiments of the present invention use the fact that a likelihood probability distribution and an optimal quantization parameter can be preliminarily calculated from the modulation type and reception SNR (signal to noise ratio) in the communication system used between a transmission node and a relay node. For each reception SNR of a range where the likelihood probability distribution can be seen as the same at the time of each modulation type, an optimal quantization parameter is calculated preliminarily, and is prepared in the relay node and the receiving node as a quantization code book. Each relay node notifies the receiving node of a code book number that corresponds to the reception SNR range only. As a result, overhead of a signal transmitted from the relay node to the receiving node is reduced. For example, in the case where there are two types of modulation types and two steps of reception SNR, there are prepared four types of quantization parameters in total. The bit number of the code book number required for notifying these quantization parameters becomes 2 bits that can express four ways of bit sequences. FIG. 4 is an example of the quantization code book of the above example where the likelihood quantization bit number is 2. This quantization code book shows the relationships between the likelihood quantization bit values and the likelihood quantization level values, for each of code books corresponding to two types of modulation types and steps of reception SNR ranges.

(First Embodiment)

Figure 5:
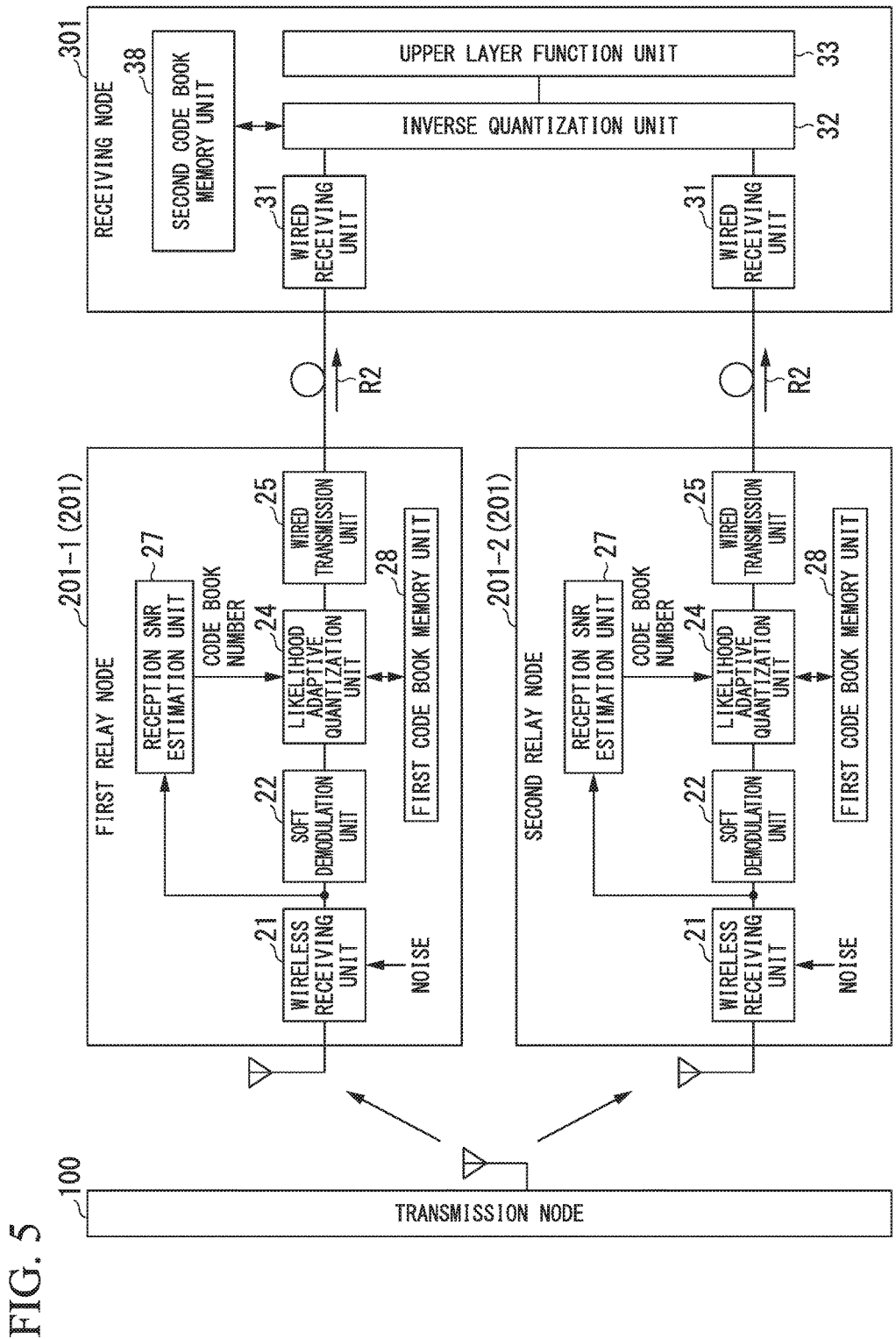
FIG. 5 is a diagram for describing a configuration of a communication system according to a first embodiment.

FIG. 5 is a diagram for describing a configuration of a communication system according to a first embodiment. The communication system shown in FIG. 5 includes a transmission node (transmission apparatus) 100 that transmits a signal, a receiving node (receiving apparatus) 301 that receives the signal, and first and second receiving nodes (receiving apparatuses) 201-1, 201-2 that relay the signal between the transmission node 100 and the receiving node 301. The first relay node 201-1 and the second relay node 201-2 are collectively referred to as relay nodes 201 when they are not differentiated (the same applies to relay nodes 202 to 204).

Figure 6:
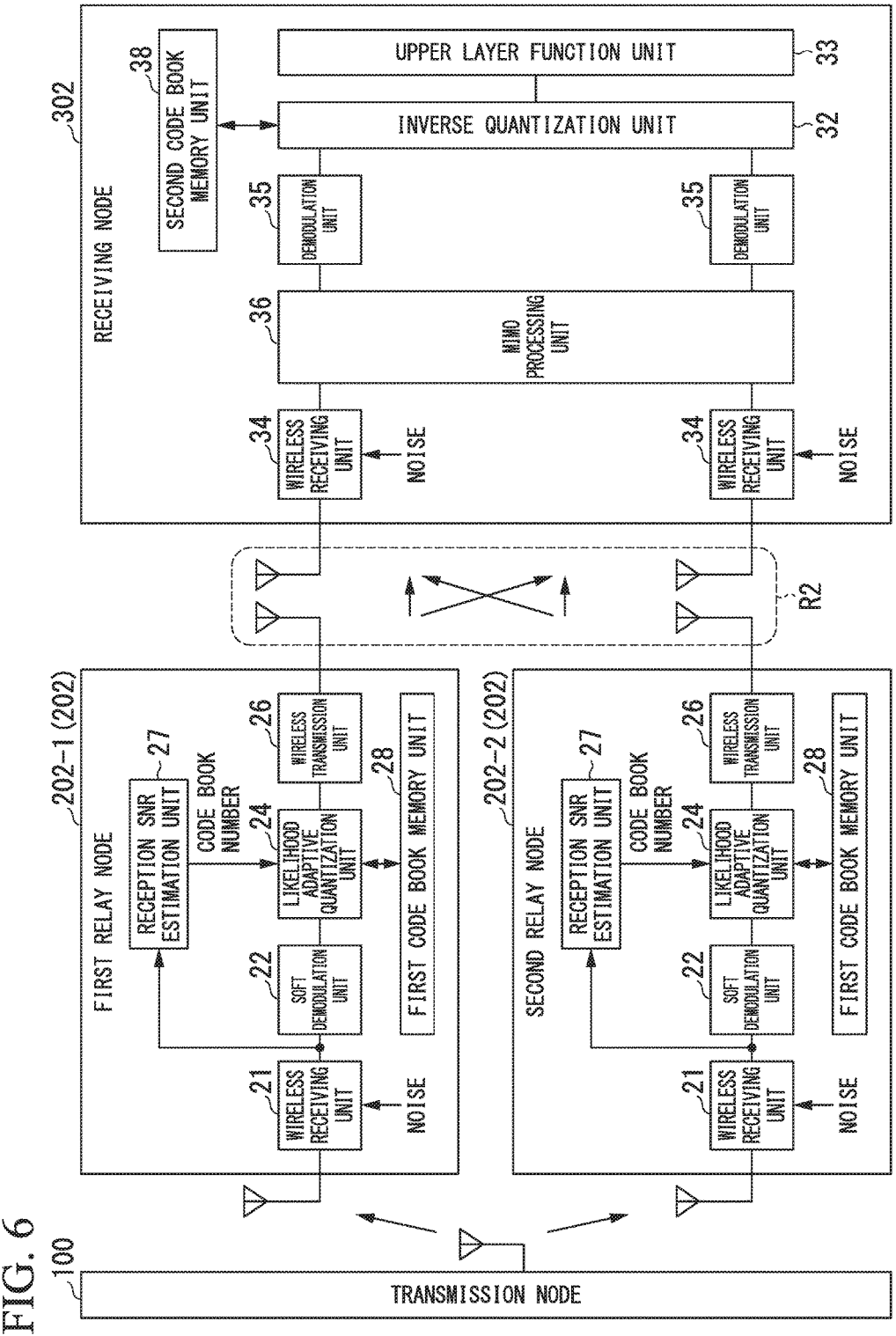
FIG. 6 is a diagram for describing a configuration of a communication system according to a second embodiment.
Figure 7:
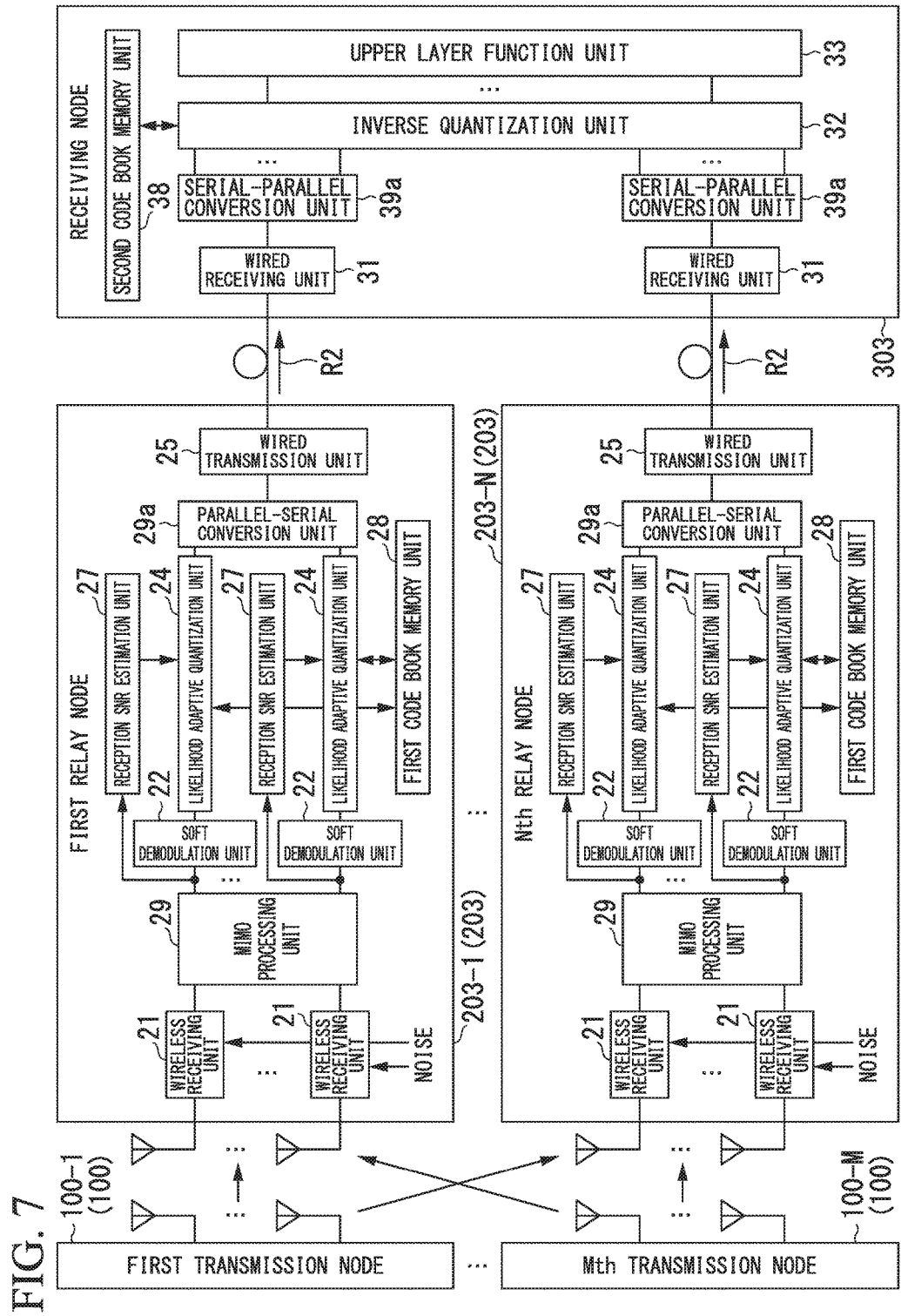
FIG. 7 is a diagram for describing a configuration of a communication system according to a third embodiment.

In FIG. 5, reference symbol R2 denotes a signal that includes a likelihood quantization bit value and a code book number (the same applies to the examples in FIG. 6 to FIG. 8).

The relay node 201 relays a signal from the transmission node 100 to the receiving node 301. For signal conversion used in signal transmission between the relay node 201 and the receiving node 301, an interface such as an existing PON (passive optical network) may be used, or a unique interface may be used.

The relay node 201 includes a wireless receiving unit (first receiving unit) 21, a reception SNR estimation unit (estimation unit) 27, a soft demodulation unit 22, a first code book memory unit (first memory unit) 28, a likelihood adaptive quantization unit (quantization unit) 24, and a wired transmission unit (transmission unit) 25.

The wireless receiving unit (first receiving unit) 21 receives a signal (first signal) transmitted by the transmission node 100.

The reception SNR estimation unit 27 estimates a reception SNR value from the signal power of the received signal and noise power. Furthermore, the reception SNR estimation unit 27 selects a code book number corresponding to a reception SNR range that has a range including the estimated reception SNR value, based on the estimated reception SNR value.

The soft demodulation unit 22 detects a likelihood of the received signal by performing soft demodulation on the received signal.

The first code book memory unit 28 stores a first quantization code book that shows, for each code book number, a relationship between a quantization parameter for quantizing the likelihood, and a likelihood quantization bit value showing the quantized likelihood. The first code book memory unit 28 may be configured with a ROM (read only memory), or a RAM (random access memory).

The likelihood adaptive quantization unit 24 obtains a relationship corresponding to the selected code book number, between the quantization parameter and the likelihood quantization bit value, by making reference to the first quantization code book. Furthermore, the likelihood adaptive quantization unit 24 obtains a likelihood quantization bit value by adaptively quantizing the detected likelihood, with use of the obtained relationship.

The wired transmission unit 25 transmits to the receiving node 300 a second signal that includes the obtained likelihood quantization bit value and the selected code book number.

The relay node 201 can be realized by causing a computer to read a relay program. The relay node 201 may realize each process by causing a CPU (central processing unit) to execute the relay program on.

The relay program causes the computer to execute receiving a signal (first signal) transmitted by the transmission node 100, estimating a reception SNR value from the signal power of the received signal and noise power, and selecting a code book number corresponding to the reception SNR range that has a range including the reception SNR value, based on the reception SNR value.

Moreover, the relay program causes the computer to execute detecting a likelihood of the signal by performing soft demodulation on the received signal, and obtaining a relationship corresponding to the selected code book number, between a quantization parameter and a likelihood quantization bit value, by making reference to a first quantization code book that shows, for each code book, the relationship between a quantization parameter for quantizing a likelihood, and a likelihood quantization bit value showing the quantizing likelihood.

Furthermore, the relay program causes the computer to execute obtaining a likelihood quantization bit value by adaptively quantizing the detected likelihood with use of the obtained relationship, and transmitting to the receiving node 301 a signal (second signal) that includes the obtained likelihood quantization bit value and the selected code book number.

The receiving node 301 receives a signal that has been transmitted from the transmission node 100 and that has been relayed by the receiving node 201.

The receiving node 301 includes a wired receiving unit (second receiving unit) 31, a second code book memory unit (second memory unit) 38, and an inverse quantization unit 32.

The wired receiving unit 31 receives a signal (second signal) transmitted by the relay node 201.

The second code book memory unit 38 stores a second quantization code book of the same content as that of the first quantization code book. The second code book memory unit 38 may be configured with a ROM or a RAM.

The inverse quantization unit 32 obtains a relationship corresponding to the selected code book number included in the received signal, between the quantization parameter and the likelihood quantization bit value, by making reference to the second quantization code book. The inverse quantization unit 32 inverse-quantizes the likelihood quantization bit value included in the received signal, using the obtained relationship.

The receiving node 301 can be realized by causing a computer to read a receiving program. The receiving node 301 may realize each process by causing a CPU to execute the receiving program.

The receiving program causes the computer to receive a signal (second signal) transmitted by the relay apparatus.

Moreover, the receiving program causes the computer to execute obtaining a relationship corresponding to the selected code book number included in the received second signal, between a quantization parameter and a likelihood quantization bit value, by making reference to the second quantization code book of the same content as that of the first quantization code book, and inverse-quantizing the likelihood quantization bit value included in the received second signal, by using the obtained relationship.

Figure 1:
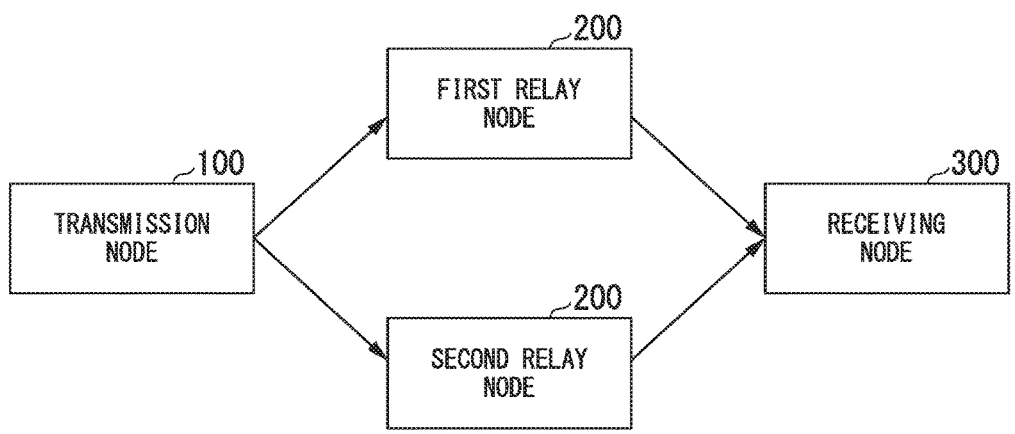
FIG. 1 is a diagram for describing a configuration of a communication system that utilizes a plurality of relay nodes according to a related art.
Figure 2:
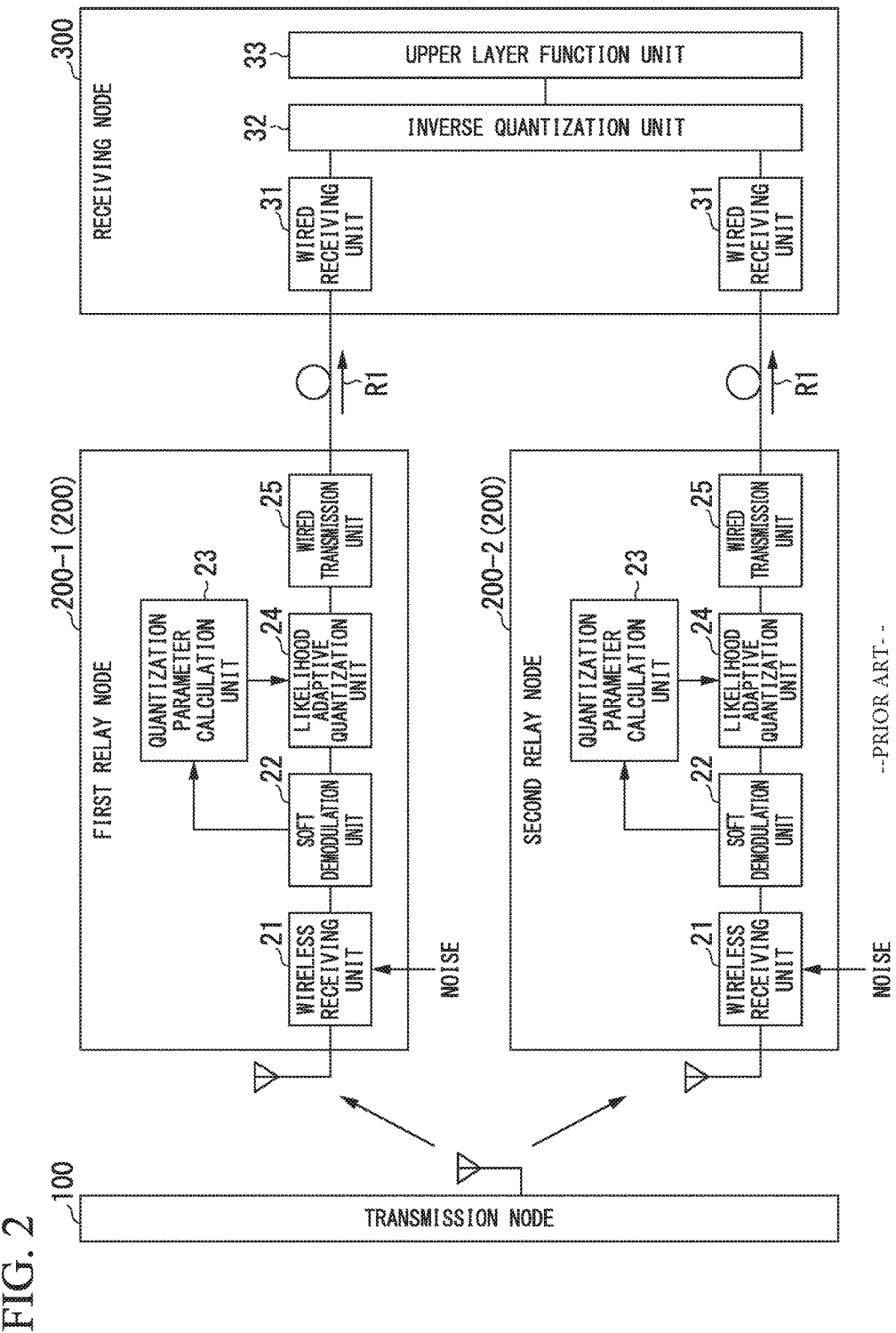
FIG. 2 is a diagram for describing a configuration of a communication system that uses likelihood adaptive quantization in the case where the connection between relay nodes and a receiving node according to a related art is wired connection.
Figure 3:
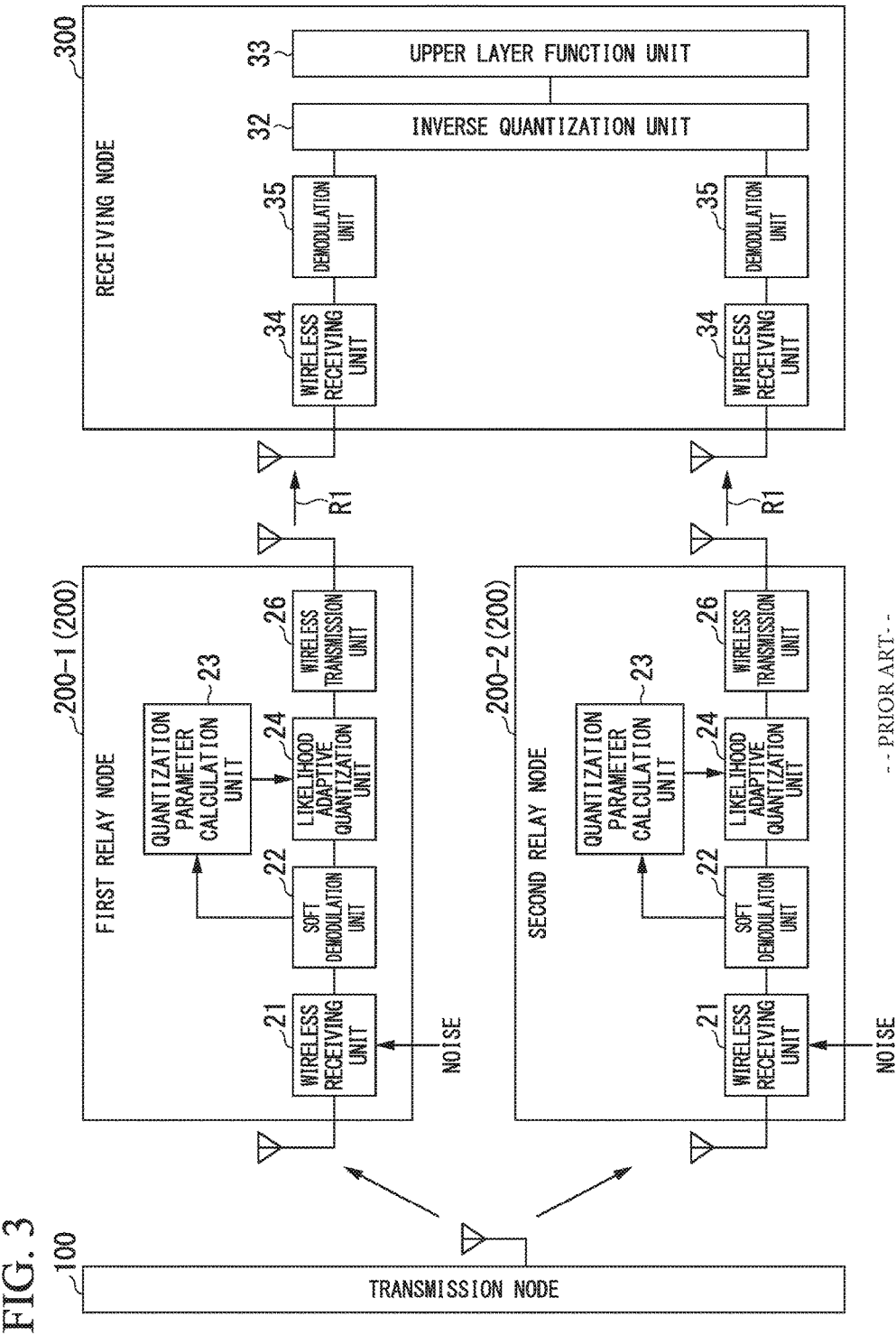
FIG. 3 is a diagram for describing a configuration of a communication system that uses likelihood adaptive quantization in the case where the connection between relay nodes and a receiving node according to a related art is wireless connection.

In the first embodiment, instead of the quantization parameter calculation performed by the quantization parameter calculation unit 23 of the relay nodes 200 of FIG. 2 and FIG. 3, the reception SNR estimation unit 27 of each relay node 201 estimates a reception SNR based on a reception signal. The reception SNR can be estimated in a manner such that having estimated the reception power and noise power first, the noise power is subtracted from the reception power to calculate the reception signal power and calculate the ratio of the reception signal power and the noise power. The noise power can be estimated by preliminarily providing a no-signal segment in the transmission signal.

The reception SNR estimation unit 27 selects from the estimated reception SNR a code book number that shows the corresponding reception SNR range, and notifies the likelihood adaptive quantization unit 24 of it. That is to say, the reception SNR estimation unit 27 identifies, among several reception SNR ranges (first reception SNR range, second reception SNR range, and so forth), the reception SNR range that has the range that includes the estimated reception SNR value. Furthermore, the reception SNR estimation unit 27 selects the code book number that corresponds to the identified reception SNR range. The code book number is preliminarily set in the reception SNR estimation unit 27. The reception SNR estimation unit 27 may acquire the code book number (or the first code book) from the first code book memory 28.

The upper layer function unit 33 preliminarily notifies the relay node 201 of the modulation method type that is used in communication between the transmission node 100 and the relay node 201. Accordingly, the reception SNR estimation unit 27 has preliminarily identified the type of modulation method. Therefore, the reception SNR estimation unit 27 can identify the code book number by identifying the reception SNR range.

The likelihood adaptive quantization unit 24 reads the quantization parameter corresponding to the notified code book number, by making reference to the quantization code book that stores quantization parameters of several patterns. Furthermore, the likelihood adaptive quantization unit 24 quantizes the likelihood using the quantization parameter, and obtains the likelihood quantization bit value. The transmission unit (wired transmission unit 25) of each relay node 201 transmits to the receiving node 301 the likelihood quantization bit value and the code book number notified from the reception SNR estimation unit 27.

The inverse quantization unit 32 of the receiving node 301, based on the notified code book number, makes reference to the quantization code book stored in the second code book memory unit 38, and after having read the quantization parameter of quantization being performed in the relay node 201, it performs an inverse quantization process on the received likelihood quantization bit value. The inverse quantization unit 32 may convert the likelihood quantization bit value into a quantization parameter by performing inverse quantization.

The connection between the transmission node 100 and the relay node 201 may be wired connection. The signal transmitted and received between the transmission node 100 and the relay node 201 may be either one of a single-carrier signal and a multi-carrier signal. The relay node 201 may perform a decoding process after the soft demodulation process.

(Second Embodiment)

A second embodiment is an example of a case where the connection between a relay node and a receiving node is wireless connection when using the method of the first embodiment. FIG. 6 is a diagram for describing a configuration of a communication system of the second embodiment. In the second embodiment, a transmission unit of a relay node 202 is a wireless transmission unit 26, and a second receiving unit of a receiving node 302 is a wireless receiving unit 34. Also in the second embodiment, the process up to acquisition of a likelihood quantization bit value and a code book number is similar to that of the first embodiment. In the second embodiment, the wireless transmission unit 26, which corresponds to a transmission unit, modulates a signal including a likelihood quantization bit value and a code book number, and transmits the modulated signal as a wireless signal to the receiving node 302. At this time, in the wireless transmission between each relay node 202 and the receiving node 302, MIMO (multiple-input multiple-output) transmission may be performed. In the receiving node 302, each wireless receiving unit 34 receives a signal from each receiving node 202. A demodulation unit 35 demodulates the received signal. An inverse quantization unit 32 performs an inverse quantization process, as with the first embodiment. At this time, the demodulation process may be either one of hard determination and soft determination. In the case of MIMO transmission, a MIMO process is performed in a MIMO processing unit 36 before the demodulation process.

The connection between the transmission node 100 and the relay node 202 may be wired connection. The signal transmitted and received between the transmission node 100 and the relay node 202 may be either one of a single-carrier signal and a multi-carrier signal. A wireless transmission unit 21 of each relay node 202 may perform an encoding process before modulation is performed. The relay node 202 or the receiving node 302 may perform a decoding process after demodulation is performed.

(Third Embodiment)

A third embodiment is an example of a case where the number of transmission nodes and the number of relay nodes are arbitrary, or in a wireless connection segment, the number of antennas of each transmission node and the number of antennas of each relay node are arbitrary, when using the method of the first embodiment. FIG. 7 is a diagram for describing a configuration of a communication system of the third embodiment. Here, the number of transmission nodes 100 is M, and the number of relay nodes 203 is N. In this case, in the wireless segment, MIMO transmission may be performed, in which single or several data streams are transmitted. In this case, each relay node 203 further includes a MIMO processing unit 29.

The relay node 203 performs reception SNR estimation on a post-MIMO process signal. Then, the relay node 203, for each data stream, performs soft demodulation and likelihood adaptive quantization as described in the first embodiment. Furthermore, a parallel-serial conversion unit 29a of the relay node 203 performs parallel-serial conversion on a likelihood quantization bit value and a code book number, and transmits the post-conversion likelihood quantization bit value and code book number to the receiving node 303.

A serial-parallel conversion unit 39a of the receiving node 303 performs serial-parallel conversion on the likelihood quantization bit value and the code book number that have been transmitted from each relay node 203. The inverse quantization unit 32 of the receiving node 303 performs an inverse quantization process as described in the first embodiment, based on the converted likelihood quantization bit value and code book number, and determines the bit for each data stream, then transmits the determination result to the upper layer function unit 33.

The connection between the transmission node 100 and the relay node 203 may be wired connection. The signal transmitted and received between the transmission node 100 and the relay node 203 may be either one of a single-carrier signal and a multi-carrier signal. The relay node 203 may perform a decoding process after the soft demodulation process has been performed.

(Fourth Embodiment)

A fourth embodiment is an example of a case where the number of transmission nodes and the number of relay nodes are arbitrary, or in a wireless connection segment, the number of antennas of each transmission node and the number of antennas of each relay node are arbitrary, when using the method of the second embodiment. FIG. 8 is a diagram for describing a configuration of a communication system of the fourth embodiment. Here, the number of transmission nodes 100 is M, and the number of relay nodes 204 is N. In this case, in the wireless segment, MIMO transmission may be performed, in which single or several data streams are transmitted. In this case, each relay node 204 further includes a MIMO processing unit 29. First transmission node 100-1 to Mth transmission node 100-M are collectively referred to as transmission nodes 100 when they are not differentiated.

The relay node 204 performs reception SNR estimation on a post-MIMO process signal. Then, the relay node 204 performs, for each data stream, soft demodulation and likelihood adaptive quantization as described in the second embodiment, and transmits the likelihood quantization bit value and the code book number to the receiving node 304.

In the receiving node 304, as described in the second embodiment, each wireless receiving unit 34 receives a signal from each relay node 204, each demodulation unit 35 demodulates the received signal, and the inverse quantization unit 32 performs an inverse quantization process. At this time, the demodulation process performed by the demodulation unit 35 may be either one of hard determination and soft determination.

The connection between the transmission node 100 and the relay node 204 may be wired connection. The signal transmitted and received between the transmission node 100 and the relay node 204 may be either one of a single-carrier signal and a multi-carrier signal. A wireless transmission unit 21 of each relay node 100 may perform an encoding process before modulation is performed. The relay node 100 or the receiving node 304 may perform a decoding process after demodulation is performed.

(Effect of the Invention)

In a system where a likelihood quantization parameter is adaptively changed and then the quantized likelihood is transmitted from a relay node to a receiving node, it is possible to reduce overhead in transmission between the relay node and the receiving node, by transmitting, from the relay node to the receiving node, only a code book number that shows a reception SNR range, instead of a quantization parameter, which requires many bits for a single notification.

Programs (such as a relay program and a receiving program) for realizing the function of each apparatus (such as a relay node and a relay node) of the several embodiments described above may be recorded on a computer-readable recording medium, and the programs recorded on this recording medium may be read and executed on a computer system to thereby perform the processes.

The "computer system" here may include an operating system (OS) and hardware such as peripheral devices.

The "computer-readable recording medium" includes a flexible disk, a magnetic optical disk, a ROM (read only memory), a writable non-volatile memory such as a flash memory, a portable medium such as a DVD (digital versatile disk), and a memory device such as a hard disk drive that is built-into a computer system.

The "computer-readable recording medium" also includes one that retains a program for a certain period of time, such as a volatile memory (for example, a DRAM (dynamic random access memory)) within a computer system serving as a server computer or a client computer in those cases where the program is transmitted via a network such as the Internet or a communication line such as a telephone line.

The above programs may also be transmitted from a computer system having these programs stored in a memory device, to another computer system, via a transmission medium or the transmitted wave in the transmission medium. The "transmission medium" that transmits the programs is a medium that has a function of transmitting information such as a network (communication network) including the Internet, and a communication line including a telephone line.

The above programs may realize a part of the functions described above.

The above programs may be a so-called difference file (difference program) that is able to realize the above functions in combination with a program recorded preliminarily on a computer system.

INDUSTRIAL APPLICABILITY

The present invention may be applied to a communication system, a relay apparatus, a receiving apparatus, a relay method, a receiving method, a relay program, and a receiving program.

REFERENCE SYMBOLS

21 Wireless receiving unit
22 Soft demodulation unit
23 Quantization parameter calculation unit
24 Likelihood adaptive quantization unit
25 Wired transmission unit
26 Wireless transmission unit
27 Reception SNR estimation unit
28 First code book memory unit
29 MIMO processing unit
29a Parallel-serial conversion unit
31 Wired receiving unit
32 Inverse quantization unit
33 Upper layer function unit
34 Wireless receiving unit
35 Demodulation unit
36 MIMO processing unit
38 Second code book memory unit
39a Serial-parallel conversion unit 100 Transmission node (transmission apparatus)
200 to 204 Relay node (relay apparatus)
300 to 304 Receiving node (receiving apparatus)

The invention claimed is:

1. A communication system comprising a transmission apparatus, a receiving apparatus, and a relay apparatus that relays a first signal from the transmission apparatus to the receiving apparatus, wherein
the transmission apparatus transmits the first signal;
the relay apparatus comprises:
a first receiver that receives the transmitted first signal;
a first memory that stores a first quantization code book, the first quantization code book showing, for each code book number, a relationship between a quantization parameter for quantizing a likelihood, and a likelihood quantization bit value showing a quantized likelihood;
at least one memory storing first Instructions;
at least one processor configured to execute the first instructions to:
estimate a reception signal to noise ratio (SNR) value from signal electric power of the received first signal and noise electric power,
select a code book number based on the estimated reception SNR value, the selected code book number corresponding to a reception SNR range, the reception SNR range having a range including the estimated reception SNR value,
perform soft demodulation on the received first signal to detect a likelihood of the received first signal,
refer the first quantization code book to obtain the relationship between the quantization parameter and the likelihood quantization bit value that corresponds to the selected code book number, and
adaptively quantize the detected likelihood by using the obtained relationship to obtain a likelihood quantization bit value for the detected likelihood; and
a transmitter that transmits, to the receiving apparatus, a second signal including the obtained likelihood quantization bit value and the selected code book number; and
the receiving apparatus comprises:
a second receiver that receives the transmitted second signal;
a second memory that stores a second quantization code book having the same content as that of the first quantization code book;
at least one memory storing second instructions; and
at least one processor configured to execute the second instructions to:
refer the second quantization code book to obtain the relationship between the quantization parameter and the likelihood quantization bit value that corresponds to the selected code book number included in the received second signal, and
inverse-quantize the likelihood quantization bit value included in the received second signal, by using the obtained relationship.

2. A relay apparatus for relaying a first signal from a transmission apparatus to a receiving apparatus, the relay apparatus comprising:
a first receiver that receives the first signal transmitted by the transmission apparatus;
a first memory that stores a first quantization code book, the first quantization code book showing, for each code book number, a relationship between a quantization parameter for quantizing a likelihood, and a likelihood quantization bit value showing a quantized likelihood;
at least one memory storing first instructions; and
at least one processor configured to execute the first instructions to:
estimate a reception signal to noise ratio (SNR) value from signal electric power of the received first signal and noise electric power,
select a code book number based on the estimated reception SNR value, the selected code book number corresponding to a reception SNR range, the reception SNR range having a range including the estimated reception SNR value,
perform soft demodulation on the received first signal to detect a likelihood of the received first signal,
refer the first quantization code book to obtain the relationship between the quantization parameter and the likelihood quantization bit value that corresponds to the selected code book number, and
adaptively quantize the detected likelihood by using the obtained relationship to obtain a likelihood quantization bit value for the detected likelihood; and
a transmitter that transmits, to the receiving apparatus, a second signal including the obtained likelihood quantization bit value and the selected code book number.

3. The receiving apparatus for receiving the second signal transmitted by the transmitter of the relay apparatus according to claim 2, the receiving apparatus comprising:
a second receiver that receives the second signal transmitted by the transmitter;
a second memory that stores a second quantization code book having the same content as that of the first quantization code book;
at least one memory storing second instructions; and
at least one processor configured to execute the second instructions to:
refer the second quantization code book to obtain the relationship between the quantization parameter and a-the likelihood quantization bit value that corresponds to the selected code book number included in the received second signal, and
inverse-quantize the likelihood quantization bit value included in the received second signal, by using the obtained relationship.

4. A relay method for a relay apparatus that stores a first quantization code book and relays a first signal from a transmission apparatus to a receiving apparatus, the first quantization code book showing, for each code book number, a relationship between a quantization parameter for quantizing a likelihood, and a likelihood quantization bit value showing a quantized likelihood, the relay method comprising:
receiving the first signal transmitted by the transmission apparatus;
estimating a reception signal to noise ratio (SNR) value from signal electric power of the received first signal and noise electric power;
selecting a code book number based on the estimated reception SNR value, the selected code book number corresponding to a reception SNR range, the reception SNR range having a range including the estimated reception SNR value;
performing soft demodulation on the received first signal to detect a likelihood of the first signal;
referring the first quantization code book to obtain the relationship between the quantization parameter and the likelihood quantization bit value that corresponds to the selected code book number;

adaptively quantizing the detected likelihood by using the obtained relationship to obtain a likelihood quantization bit value for the detected likelihood; and transmitting, to the receiving apparatus, a second signal including the obtained likelihood quantization bit value and the selected code book number.

5. A receiving method for receiving the second signal transmitted by the relay apparatus according to claim 4, the receiving method comprising:

receiving the second signal transmitted by the relay apparatus;

referring a second quantization code book to obtain the relationship between the quantization parameter and the likelihood quantization bit value that corresponds to the selected code book number included in the received second signal, the second quantization code book having the same content as that of the first quantization code book; and inverse-quantizing the likelihood quantization bit value included in the received second signal, by using the obtained relationship.

6. A non-transitory computer-readable recording medium having computer-executable instructions embodied thereon that, when executed by a computer of a relay apparatus to realize relay of a signal from a transmission apparatus to a receiving apparatus, the relay apparatus storing a first quantization code book, the first quantization code book showing, for each code book number a relationship between a quantization parameter for quantizing a likelihood, and a likelihood quantization bit value showing a quantized likelihood, the computer-executable instructions causing the computer to execute:

receiving the first signal transmitted by the transmission apparatus;

estimating a reception signal to noise ratio (SNR) value from signal electric power of the received first signal and noise electric power;

selecting a code book number based on the reception SNR value, the selected code book number corresponding to a reception SNR range, the reception SNR range having a range including the reception SNR value;

performing soft demodulation on the received first signal to detect a likelihood of the first signal;

referring the first quantization code book to obtain the relationship between the quantization parameter and the likelihood quantization bit value that corresponds to the selected code book number;

adaptively quantizing the detected likelihood by using the obtained relationship to obtain a likelihood quantization bit value for the detected likelihood; and transmitting, to the receiving apparatus, a second signal including the obtained likelihood quantization bit value and the selected code book number.

7. A non-transitory computer-readable recording medium having computer-executable instructions embodied thereon that, when executed by a computer of the receiving apparatus to realize reception of the second signal transmitted by the relay apparatus according to claim 6, the computer-executable instructions causing the computer to execute:

receiving the second signal transmitted by the relay apparatus;

referring a second quantization code book to obtain the relationship between the quantization parameter and the likelihood quantization bit value that corresponds to the selected code book number included in the received second signal, the second quantization code book having the same content as that of the first quantization code book; and inverse-quantizing the likelihood quantization bit value included in the received second signal, by using the obtained relationship.

* * * * *